United States Patent [19]
Ikariishi et al.

[11] 4,093,321
[45] June 6, 1978

[54] TAPER JOURNAL BEARING FOR ROLLS FOR USE IN ROLLING MILLS

[75] Inventors: Koichi Ikariishi, Ichihara; Kanji Kondo; Toko Teshiba, both of Chiba, all of Japan

[73] Assignee: Kawasaki Steel Corporation, Kobe, Japan

[21] Appl. No.: 668,723

[22] Filed: Mar. 19, 1976

[30] Foreign Application Priority Data

Mar. 29, 1975  Japan .................................. 50-41481[U]

[51] Int. Cl.² .............................................. F16C 3/00
[52] U.S. Cl. ........................................ 308/20; 308/121; 308/202; 308/214
[58] Field of Search ................... 308/20, 202, 201 R, 308/208, 211, 212, 214

[56] References Cited

U.S. PATENT DOCUMENTS

| 3,160,265 | 12/1964 | Hagenbook | 308/20 |
| 3,306,441 | 2/1967 | Sanjers et al. | 308/20 |
| 3,892,306 | 7/1975 | Bertavd | 308/20 |

Primary Examiner—Richard A. Bertsch

[57] ABSTRACT

The invention relates to a taper journal bearing for rolls, used in rolling mills. The bearing includes a bushing installed in a roll bearing box, a sleeve closely fitted onto a taper journal of the roll, for supporting a load thereof, an oil film deposited between the bushing and the sleeve, and means for attaching the sleeve to the roll at an area other than that directly subjected to a rolling force. The invention eliminates the increased variation in the reduction force taking place at each rotation of the roll, due to a deformation of the sleeve. The latter is caused by a clearance at a keyway formed in the sleeve, for a key arranged between the sleeve and the taper journal.

7 Claims, 4 Drawing Figures

TAPER JOURNAL BEARING FOR ROLLS FOR USE IN ROLLING MILLS

BACKGROUND OF THE INVENTION

1. Field of the Invention

This invention relates to a taper journal bearing for rolls for use in rolling mills.

2. Description of the Prior Art

A taper journal bearing of a roll of this kind provides a bearing surface with oil film between a bushing housed in a bearing box of a roll stand and a sleeve closely fitted on a taper journal of the roll. In this case, a key is provided between the sleeve and the taper journal of the roll to prevent a relative movement therebetween.

The bearings of this type have been extensively used, but they have often encountered a problem of variation in reduction force due to an eccentricity of a rotating axis of the roll, which has been considered to be unavoidable resulting from the inherent construction of the bearings by the use of oil films.

It will be understood that the expression "reduction force" used hereinbelow will mean a force acting upon rolls for rolling plates therebetween.

Instead of the plain bearings, cylindrical roller bearings have been used in rolling mills, which may mitigate the variations in reduction force due to the eccentricity of rotating axes of rolls. However, the durability of the roller bearings is inferior to that of the plain bearings when used at high speeds with high accuracy. This problem has not been solved. In addition, a change of the rolls with the roller bearings is very troublesome. Accordingly, the plain bearings with oil film are greatly advantageous for multi-Hi rolling mills such as hot or cold strip mills.

Under the circumstances, it has been expected to eliminate the variation in reduction force in the plain bearings with oil film and the control of the variation in reduction force acting upon roll bearing boxes has been under investigation. However, any satisfactory answer to this problem has not been obtained.

It has been found from data in work rolls of 2-Hi rolling mills and back-up rolls of 4-Hi rolling mills that the variation in the reduction force is caused every one rotation of the roll due to the eccentricity thereof and there are minus peaks in extremely steep curves of the reduction force. It is very difficult, if not impossible, to compensate these violent changes in reduction force by the present technique for controlling thickness of plates to be rolled.

In view of the fact that such violent changes in reduction force occur only in the rolling mills using the plain bearings with oil film, we have thoroughly investigated the construction of the bearing allowing the violently varying reduction force and found that it is caused by the keyway formed in the sleeve for the key for the purpose of preventing the relative movement of the taper journal and sleeve.

The keyway formed in the inside of the sleeve is somewhat deeper than the height of the key extending beyond the taper journal to form a clearance between the key and a bottom of the groove or keyway of the sleeve. The clearance is unavoidably provided in consideration of the thermal expansion of the key. Such a clearance between the key and the bottom of the groove permits an elastic deformation of the sleeve to abruptly reduce the reduction force at the moment when the keyway of the sleeve comes in registry with a plane where the sleeve is subjected to the reduction force. It has been found that an amplitude of variation in reduction force or a difference between maximum and minimum reduction forces may often reach as much as 18 tons while idling of the roll irrespective of reduction forces and rotating speeds.

This abrupt change in reduction force will adversely affect in conjunction with a high plasticity of the material to be rolled at this stage the accuracy of the thickness of plates to be rolled at relatively low rolling speed in stands on an entry side (particularly a first stand) of tandem rolling mills and in initial rolling operation of reversible mills. The unevenness in thickness of the rolled plates caused by the abrupt change in reduction force could not be completely eliminated by repeated rolling operations following thereafter.

SUMMARY OF THE INVENTION

In order to avoid the abrupt change in reduction force effectively, according to the invention in consideration of the above fact, the key for preventing the relative movement of the sleeve to the taper journal of the roll is removed from the taper journal, upon which the reduction force acts directly, to an area upon which the reduction force does not acts.

It is an object of the invention to provide an improved taper journal bearing for rolls for use in rolling mills, whch remarkably mitigates the variation in reduction force to avoid unevennesses in thickness of plates to be rolled.

Another object of the invention is to provide an improved taper journal bearing for rolls for use in rolling mills, which will be relatively simple and inexpensive to manufacture, easy to install, maintain, repair and replace, and rugged and durable in use.

The invention will be more fully understood by referring to the following detailed specification and claims taken in connection with the appended drawings.

DESCRIPTION OF THE PREFERRED EMBODIMENTS

Figure 1:
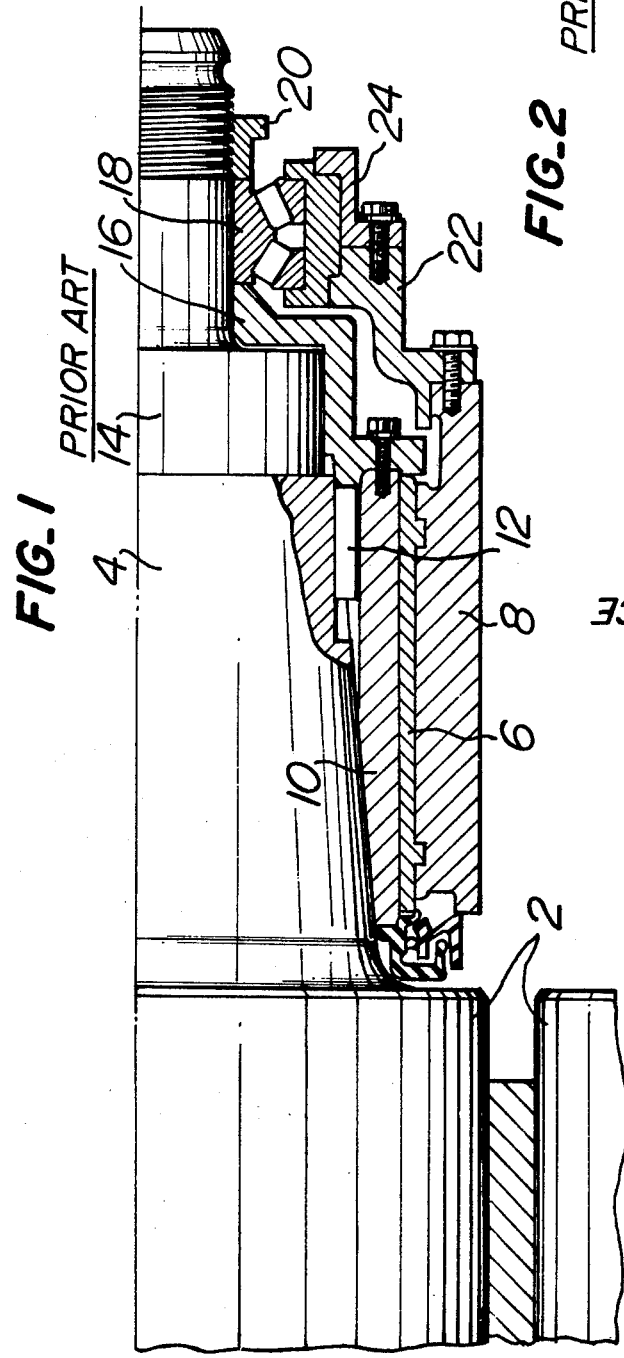
FIG. 1 is a sectional view of a part of a taper journal bearing for a roll in a prior art.

Referring to the attached drawings, in FIG. 1, there is shown one end of a roll 2 for a rolling mill having a taper journal 4. A bearing for the taper journal as shown is a taper plain bearing in the prior art wherein a bearing surface with oil film is provided between a bushing 6 housed in a bearing box 8 of a roll stand and a sleeve 10 closely fitted on the taper journal 4. In generally, the roll has two taper plain bearings, only one of which will be described in detail, since they are symmetrically the same.

A key 12 is inserted into a groove or keyway formed in the taper journal 4 and the sleeve 10 to prevent it from rotating relative to the journal 4 of the roll 2 because otherwise such a relative rotation will cause heat from a sliding friction therebetween such that the sleeve 10 seizes or jams on the taper journal.

In FIG. 1, the roll 2 comprises a straight neck 4 which is covered with a sleeve retainer 16. A thrust bearing 18 is held by a lock nut 20, a bearing box end plate 22 bolted to the bearing box 8 and a bearing cover 24 bolted to the end plate 22.

In a rolling mill having rolls supported on such bearing surfaces with oil film, it has often encountered variations in reduction force due to an eccentricity of rotating axes of the rolls which adversely affect the accuracy of thicknesses of materials or plates to be rolled. It has been considered that such a disadvantage is unavoidable owing to the inherent construction of the bearings which support the load through oil films.

We have thoroughly investigated the construction of the bearing allowing the violently varying reduction force and found that it is caused by the keyway formed in the sleeve 10 for the key 12 for the purpose of preventing the relative movement of the taper journal 4 and sleeve 10.

Referring to FIG. 1, the keyway formed in the inside of the sleeve 10 is somewhat deeper than the height of the key 12 extending beyond the taper journal 4 to form a clearance between the key 12 and a bottom of the groove or keyway of the sleeve 10, which clearance is unavoidably provided for the thermal expansion of the key 12. Because of the clearance between the key 12 and the bottom of the groove, the sleeve 10 is elastically deformed to reduce the reduction force abruptly at the moment when the keyway of the sleeve 10 comes in a plane where the sleeve is subjected to the reduction force. It has been found that an amplitude of variation in reduction force or difference between the maximum and minimum reduction forces may reach as much as 18 tons while idling of the roll irrespective of reduction forces and rotating speeds.

This abrupt change in reduction force will adversely affect in conjunction with a high plasticity of the material to be rolled at this stage the accuracy of the thickness of plates to be rolled at relatively low rolling speed in stands on an entry side (particularly a first stand) of tandem rolling mills and in initial rolling operation of reversible mills. The unevenness in thickness of the rolled plates caused by the abrupt change in reduction force could not be completely eliminated by repeated rolling operations following thereafter.

In order to avoid the abrupt change in reduction force effectively, according to the invention in consideration of the above fact, the key 12 for preventing the relative movement of the sleeve 10 to the taper journal 4 of the roll is omitted so as to remove the elastic deformation of the sleeve 10 in the area upon which the reduction force acts.

Figure 3:
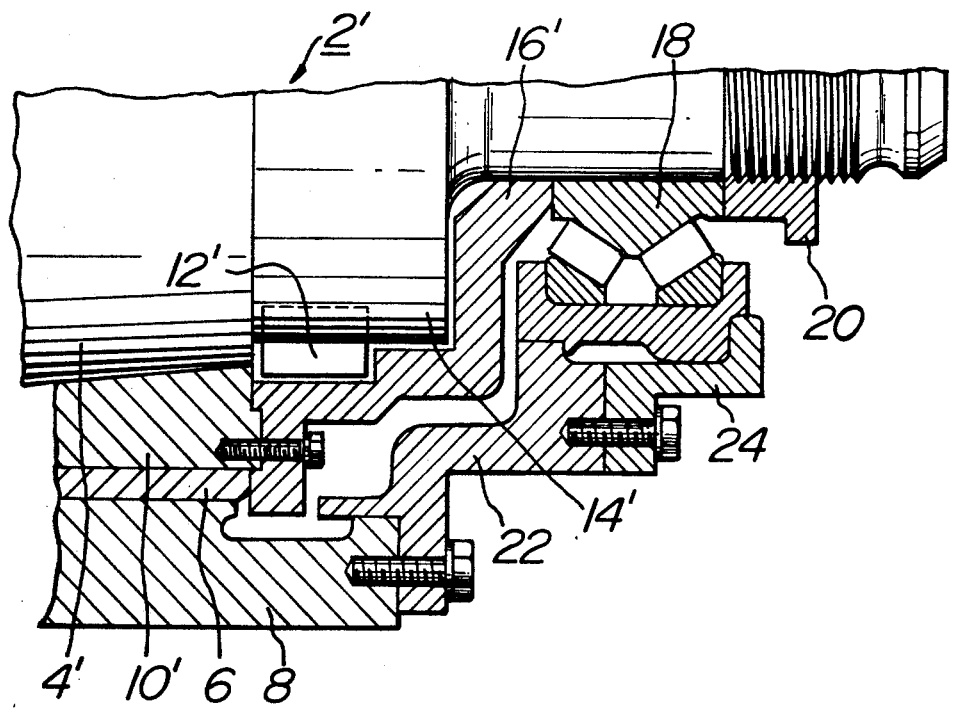
FIG. 3 is a sectional view of a part of a taper journal bearing of a preferred embodiment according to the invention.

Referring now to FIG. 3, wherein like components have been designated by the same reference numerals as in FIG. 1 and modified or improved components have been shown by numerals with primes, there is shown a preferred embodiment of the bearing according to the invention applied to a taper journal 4' of a roll 2'. The roll 2' is provided at its straight neck 14' with a key 12' instead of the key 12 located at the taper journal shown in FIG. 1. A bearing surface with oil film is provided between a bushing 6 housed in a bearing box 8 for a roll stand and a sleeve 10' closely fitted on the taper journal 4' as in FIG. 1. A sleeve retainer 16' is fitted on the straight neck 14' and bolted to the sleeve 10'. A thrust roller bearing 18 is held by a lock nut 20, a bearing box end plate 22 bolted to the bearing box 8 and a bearing cover 24 bolted to the end plate 22. The key 12' arranged within a groove or keyway formed in the straight neck 14' and the sleeve retainer 16' thereby indirectly preventing it from rotating relative to the roll 2'.

In the embodiment illustrated in FIG. 3, the key 12' is arranged between the straight neck 14' and the sleeve retainer 16'. As an alternative, a key instead of the key 12' may be radially provided in a keyway formed in an end surface or a shoulder of the straight neck 14' and an inner end surface of the sleeve retainer 16'. Furthermore, a key may be provided in a keyway formed between the end of the sleeve retainer 16' and a part of a reduced diameter portion of the roll onto which an inner race of the thrust bearing 18 is fitted.

Moreover, if the sleeve 10' extends substantially beyond the bushing 6 in its axial direction (i.e. beyond the area onto which a reduction force exerts), the sleeve 10' may be directly secured to the taper journal 4' with the extending portion of the sleeve. A pin, cotter or other known anchoring means may of course be used instead of the key. The anchoring means may be single or plural in one bearing.

Figure 2:
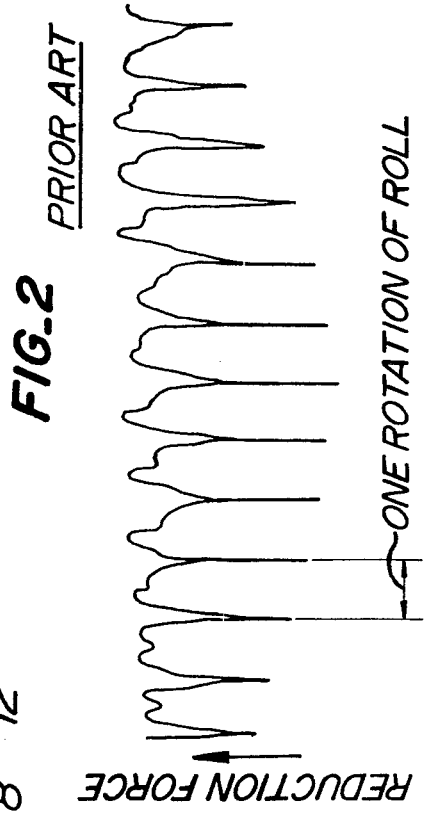
FIG. 2 is a graphical representation of variation in reduction force acting upon the bearing as shown in FIG. 1.
Figure 4:
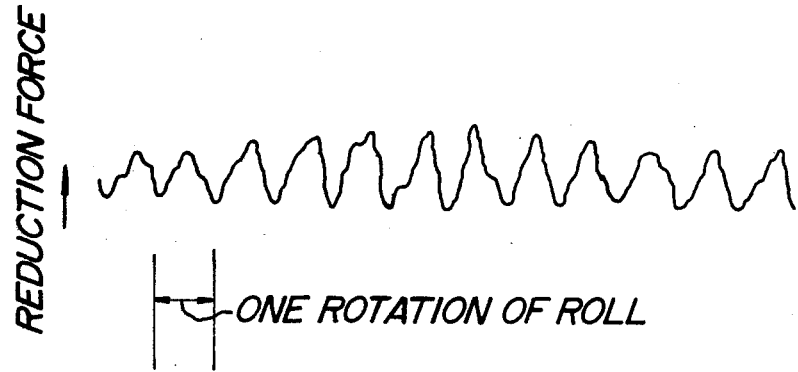
FIG. 4 is a graphical representation of variation in reduction force acting upon the bearing according to the invention as shown in FIG. 3.

In an experiment of the reduction force, rolls having sleeves 10' fixed thereto as shown in FIG. 3 were used as back-up rolls of a first stand of 6-tandem cold rolling mill. We measured reduction forces exerted on the rolls while they were idling under a reduction force of approximately 250 tons at a circumferential speed 100 meters per minute. One result recorded on a graph is shown in FIG. 4. The curve in FIG. 4 illustrates the fact that the amplitude of variation in reduction force decreases remarkably to a range of the order of approximately 3 tons probably resulting from an eccentricity of a rotating axis of the roll due to inherently unavoidable tolerance in manufacturing of the roll. The curve does not include the minus peaks as in FIG. 2 which extend over as much as 18 tons. The eccentricity of the roll as shown in FIG. 3 is only one sixth of that of the roll as shown in FIG. 1.

Table 1 shows a comparison of the variation in thickness of plates rolled by the rolls according to the invention with that of the prior art. The variations were measured by the use of X-rays at output sides of first and sixth roll stands of the 6 tandem cold rolling mill when the plates of 2.3 millimeter thickness were rolled to 0.211 millimeters. As can be seen from the Table 1, the variation in thickness according to the invention is about one half of that in the prior art.

TABLE 1

| | Variation in thickness of rolled plates | | |
|---|---|---|---|
| | first stand | At sixth stand | |
| | (due to eccentricity) | (due to eccentricity of first stand) | Total* |
| Present invention | none | none | 2 – 3 μ |
| Prior art | 24.2 μ | 4.4 μ | 5 – 6 μ |

*The total includes the eccentricity of the first stand, unevennesses of starting material and errors in measurement.

The present invention can completely eliminate the steep variations or extremely sharp minus peaks of the reduction force resulting from the keyway of the taper journal and permits only a slight variation in the reduction force which serves to improve the rolling accuracy and facilitate the correction or compensation in the control of plate thicknesses to be rolled according to the existing circumstances. In this manner, the present invention can substantially avoid the variation in thickness of plates to be rolled due to the eccentricity of rolls.

While we have described our invention in detail in its preferred embodiment, it will be obvious to those skilled in the art, after understanding our invention, that various changes and modifications may be made therein without departing from the spirit or scope thereof.

What is claimed is:

1. A taper journal bearing for rolls for use in rolling mills, comprising a bushing housed in a roll bearing box, a sleeve closely fitted onto a taper journal of the roll, an oil film deposited between said bushing and said sleeve, and means for fixing said sleeve to said roll, said fixing means arranged at an area other than that directly subjected to a rolling force acting upon said sleeve, the rolling force being transmitted from said roll bearing box.

2. A taper journal bearing as set forth in claim 1, wherein said fixing means comprise a key and a keyway arranged between a straight neck adjacent to said taper journal and a sleeve retainer covering said straight neck and connected to said sleeve.

3. A taper journal bearing as set forth in claim 1, wherein said sleeve extends outwardly beyond said bushing in its axial direction to an area other than that directly subjected to a rolling force and at this area said sleeve is directly fixed to said taper journal with the extending portion of the sleeve forming said fixing means.

4. A taper journal bearing as set forth in claim 1, having a plurality of said fixing means.

5. A taper journal bearing as set forth in claim 1, wherein said fixing means is an anchoring means.

6. A taper journal bearing as set forth in claim 5, wherein said anchoring means is an anchoring pin.

7. A taper journal bearing as set forth in claim 5, wherein said anchoring means is a cotter.

* * * * *